United States Patent [19]

Jordan

[11] Patent Number: 5,759,462
[45] Date of Patent: Jun. 2, 1998

[54] ELECTRICALLY CONDUCTIVE TAPES AND PROCESS

[75] Inventor: Erich Gebhard Jordan, Nürtingen, Germany

[73] Assignee: Amoco Corporaiton, Chicago, Ill.

[21] Appl. No.: 467,057

[22] Filed: Jun. 6, 1995

Related U.S. Application Data

[62] Division of Ser. No. 324,034, Oct. 14, 1994, abandoned.

[51] Int. Cl.$^6$ ................................................. B29C 47/06
[52] U.S. Cl. ................. 264/105; 264/103; 264/147; 264/173.14; 264/173.18; 264/173.19; 264/DIG. 47
[58] Field of Search ........................ 264/105, 104, 264/103, 147, DIG. 47, 173.14, 173.19, 173.18

[56] References Cited

U.S. PATENT DOCUMENTS

| | | | |
|---|---|---|---|
| 3,586,697 | 6/1971 | Okuhashi | 57/140 |
| 3,639,573 | 2/1972 | Port | 264/147 |
| 3,760,046 | 9/1973 | Schwartz et al. | 264/147 |
| 3,969,559 | 7/1976 | Boe | 428/87 |
| 4,129,632 | 12/1978 | Olson et al. | 264/147 |
| 4,435,241 | 3/1984 | Corbett | 156/244.11 |
| 4,521,359 | 6/1985 | Tsien | 264/105 |
| 5,071,699 | 12/1991 | Pappas et al. | 428/265 |
| 5,091,130 | 2/1992 | Bahia | 264/103 |
| 5,092,683 | 3/1992 | Wurr | 428/244 |
| 5,188,895 | 2/1993 | Nishino et al. | 264/173.14 |
| 5,236,647 | 8/1993 | Lynch | 264/105 |

FOREIGN PATENT DOCUMENTS

| | | | |
|---|---|---|---|
| 0240976 | 10/1987 | European Pat. Off. | |
| 0512364 | 11/1992 | European Pat. Off. | |
| 59-215827 | 12/1984 | Japan | 264/104 |
| 61-55272 | 3/1986 | Japan . | |
| S61-108710 | 5/1986 | Japan . | |
| 61-209137 | 9/1986 | Japan | 264/104 |
| 62-53819 | 3/1987 | Japan | 264/104 |
| 63-27229 | 2/1988 | Japan | 264/105 |
| 1073741 | 6/1967 | United Kingdom . | |
| 2030927 | 4/1980 | United Kingdom . | |
| WO 93/01110 | 1/1993 | WIPO . | |

OTHER PUBLICATIONS

JP 58024449A, Database WPI, Section CH, Week 8312, Derwent Publications, Feb. 14, 1983.
JP 62018261A, Database WPI, Section CH, Week 8709, Derwent Publications, Jan. 27, 1987.
JP 1099297 A, Database WPI, Section CH, Week 8921, Derwent Publications, Apr. 18, 1989.
H. F. Mark et al., "Encyclopedia Of Polymer Science And Engineering" 1987, vol. 7, pp.114–115.

*Primary Examiner*—Jeffery R. Thurlow
*Attorney, Agent, or Firm*—Stephen L. Hensley

[57] ABSTRACT

Electrically conductive tape yarns of two or more layers comprising thermoplastic polymer resin and electrically conductive particles are prepared by a process comprising extruding a multilayer film containing at least one electrically conductive layer and at least one layer substantially free of electrically conductive particles, quenching the film, slitting the film into tapes and orienting the film before or after slitting.

10 Claims, 1 Drawing Sheet

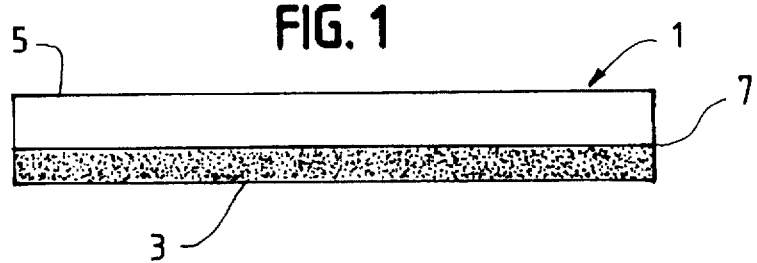
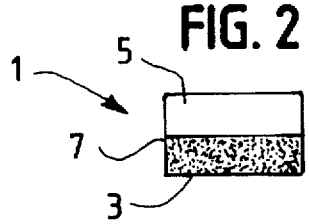
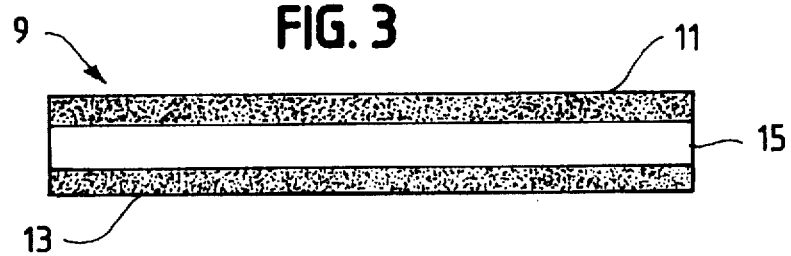
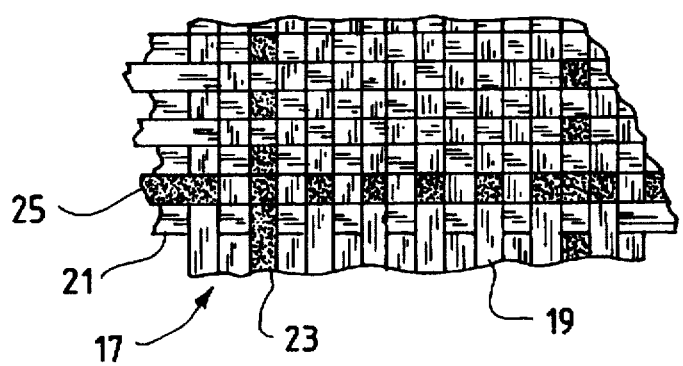

ELECTRICALLY CONDUCTIVE TAPES AND PROCESS

This is a divisional of application Ser. No. 08/324,034, filed Oct. 14, 1994, now abandoned.

FIELD OF THE INVENTION

This invention relates to electrically conductive multi-layer tapes comprising thermoplastic resin and electrically conductive particles, to a method for making such tapes and to fabrics and fabric products comprising such tapes.

BACKGROUND OF THE INVENTION

Bulk containers constructed from woven tapes of synthetic materials, such as polyolefins and polyester, are widely used for storing, handling and transporting bulk particulate materials such as fertilizers, cement, chemicals, agricultural products, minerals and the like. Contributing to the use of such containers are high strength and durability, low cost, chemical inertness, good coverage, recyclability and ease of manufacture of the tapes and fabrics. A disadvantage of such containers, however, is their tendency to accumulate static charge due to friction such as that occurring during loading, unloading and shifting of their contents. In the case of containers constructed from woven polypropylene tapes, surface resistivities typically range from about $1 \times 10^{12}$ to about $1 \times 10^{14}$ ohms. However, in environments in which ignitable gases or airborne particulates are present, resistivities of $1 \times 10^8$ or lower may be needed to avoid accumulation of electrostatic charge capable of presenting risk of ignition.

In mining, for example, to prevent explosions due to static electricity from filling or emptying bulk containers in areas where flammable gases are present, bulk containers have been made from fabrics incorporating metal threads or carbon fibers to dissipate static charge. Such fabrics with carbon fibers interwoven with polyolefin filaments are disclosed in Canadian Patent No. 1,143,673. A disadvantage is that elongation of the metal threads and carbon fibers is less than that of other filaments or yarns of the fabrics, leading to breakage of the conductive threads. This breakage results in interruption of conductivity and can actually increase the risk of sparking and explosion if static electric charging occurs. It is also known to use synthetic fabrics rendered conductive, or not electrically chargeable, by chemical treatments. However, the treatments add cost and complexity to the fabric manufacturing process and often lose their effectiveness over time. Longer lasting treatments can impair recyclability of the fabrics.

Another approach has been to prepare fabrics from tapes or other yarns having conductive particles, such as metallic particles or conductive carbon black, incorporated therein. Published International Application No. WO 93/01110 (1993), discloses flexible containers for bulk materials prepared from fabric in which tapes having conductive particles incorporated therein are included in the weave in the warp, weft or both at prescribed spacings to impart conductivity adequate to dissipate surface charge. A flexible intermediate bulk container, identified as Pactainer ED, having such tapes woven into the warp and weft of fabrics used for both the body and loading spout of the containers, is described in promotional material of unknown date issued by Empac Verpackungs-GmbH of Emsdetten, Germany. The conductive tapes are polypropylene with conductive carbon black incorporated therein. Container fabrics in which conductive threads of synthetic fibers with conductive carbon black incorporated therein are interwoven with nonconductive threads in both the warp and weft to provide for dissipation of static charge are reported in U.S. Pat. No. 5,092,683.

While these containers and fabrics provide protection against static charging, they have drawbacks. Interweaving of conductive filaments or threads with the tape yarns typically used in container fabrics normally requires separate beaming and tension control for the different types of yarns due to their different dimensions, cross-sections and strengths. This can add cost and complexity to weaving equipment and processes. Without such modifications, breakage of filaments and interruption of weaving due to overlapping of filaments by the wider, flat tapes often occur. Even with separate beaming and tension control, however, weaving of conductive filaments with tapes tends to yield fabrics in which the typically smaller, essentially round cross-sectioned filaments may be overlapped or covered by the wider, flatter tapes. The result is that the conductive filaments tend to be buried within the fabric for part of their lengths. Although this burying of the filaments does not normally affect actual conductivity or charge dissipating capability of the fabrics, it tends to limit their marketability and use because the fabrics often are not recognized as conductive by customers and users. Further disadvantages of the conductive filaments, as well as the conductive tapes of Application No. WO 93/01110, are their strength, elongation and manufacture. Conductive particle loadings high enough to impart adequate electrical conductivity are also high enough to complicate melt spinning of filaments, extrusion of films and slitting of tapes. In melt spinning of filaments, high particulate loadings increase shear and, in turn, polymer degradation, such that filament strength is reduced. Strength is also reduced due to presence of the conductive particles. As a result, breakage can occur during weaving. Use of higher molecular weight polymers to compensate for polymer degradation is ineffective because such polymers are usually too viscous in the molten state to obtain good dispersion of the relatively high levels of conductive particles needed for conductivity. Problems encountered in melt spinning highly filled filaments and a modified process for spinning and partially orienting such filaments are disclosed in U.S. Pat. No. 5,091,130. In film extrusion and slitting to form tapes, high loadings of conductive particles also cause difficulties. Extruded films with thin or weak spots often are formed such that the films or tapes are prone to breakage during drawing and weaving. Gaps in the extruded film also can result and can impair product quality and process efficiency. Further, as with conductive particle-filled threads or filaments, strength of conductive particle-filled tapes may be reduced due to the conductive particles. Presence of conductive particles throughout the films also impairs slitting of the same into tapes because the particles abrade slitting blades. Thus, tape quality suffers unless added costs are incurred for frequent blade replacement.

Accumulation of electrostatic charge in synthetic fabrics is disadvantageous in other applications and environments. Examples include the nuisance of clinging garments, the shock frequently received when contact is made with a grounded object while standing on a carpeted surface and damage to sensitive electronic circuits due to accumulation of charge in carpets. Patents related to conductive carpet backings and other fabrics to reduce static charge include commonly assigned U.S. Pat. No. 4,138,519 (secondary carpet backing having conductive fiber with conductive core around which nonconductive fiber is spun); U.S. Pat. No. 5,071,699 (fabric woven from tapes or filaments of polypropylene, optionally containing antistatic agent, which also may be interwoven with conductive carbon, metallic or metal-coated plastic fibers, wherein the fabric is coated with a thermoplastic polymer containing antistatic agent); U.S. Pat. No. 2,845,962 (antistatic fabric made from fibrous material containing electrically conductive carbon black in combination with fibrous material free from carbon black); U.S. Pat. No. 3,288,175 (incorporation of metallic fibers in textile fibers and weaving of same to produce anti-static fabric); U.S. Pat. No. 3,586,597 (antistatic fabrics containing conductive fiber having a thermoplastic core coated with a resinous matrix of finely divided silver or carbon black); U.S. Pat. No. 3,986,530 (anti-static cloth formed from electrically conductive thread having electroless metal plated staple fibers and metallic filaments); and U. K. Patent Application No. 2,101,559 (conductive fabric from fibrous or ribbon-like material, e.g., fibrillated polypropylene, with conductive yarns, e.g., metal, incorporated into the weave as warp yarns or knitted from a combination of conductive and non-conductive yarns; the fabric is coated on one side with a water-impermeable coating and stitched into desired shape with electrically conductive thread).

The above patents and publications do not disclose the invented electrically conductive tapes, fabrics or process.

SUMMARY OF THE INVENTION

This invention provides electrically conductive tape comprising thermoplastic polymer having electrically conductive particles incorporated therein, characterized in that the tape is a multilayer tape in which at least one layer comprising thermoplastic polymer having an effective amount of electrically conductive particles incorporated therein forms an external surface layer of the tape and is adhered to at least one layer of a thermoplastic polymer composition at least substantially free of electrically conductive particles at an interface between such layers. In somewhat greater detail, the invention provides electrically conductive tape in the form of essentially flat, multilayer tape of essentially rectangular cross-section comprising at least one layer that provides an essentially flat external surface of the tape and comprises at least one thermoplastic resin having incorporated therein an effective amount of electrically conductive particles, such layer being adhered to at least one other layer comprising thermoplastic resin composition at least substantially free of conductive particles. In another embodiment, the invention provides fabrics comprising such conductive tapes. Bags, containers, carpet backings and other products produced from such fabrics are also provided.

The invention further provides a process for forming electrically conductive tapes comprising forming a quenched film comprising at least one layer of thermoplastic resin having incorporated therein an effective amount of electrically conductive particles and at least one layer of thermoplastic resin composition at least substantially free of electrically conductive particles; slitting the film along its length; and orienting the film at least in the lengthwise direction. In a preferred embodiment the process comprises (i) coextruding a multilayer film comprising at least one layer of a first thermoplastic resin composition comprising at least one polyolefin resin having a melt flow rate of about 2 to about 5 grams per 10 minutes according to ASTM D-1238 and an effective amount of electrically conductive particles, and at least one layer of a second thermoplastic resin composition comprising at least one polyolefin resin having a melt flow rate of about 3 to about 8 grams per 10 minutes according to ASTM D-1238 and being at least substantially free of conductive particles, wherein the ratio of the melt flow rate of the first thermoplastic resin composition to the melt flow rate of the second thermoplastic resin composition is about 0.1:1 to about 0.5:1; (ii) quenching the multilayer film; (iii) slitting the quenched film into a plurality of tapes; and (iv) stretching the tapes longitudinally to provide tapes having tenacities of at least about 1.8 cN per dtex and elongation of about 15% to about 25% determined according to Deutsche Industries Norm 53857.

An advantage of the invented tapes is that the layer or layers comprising thermoplastic resin and electrically conductive particles contains sufficient conductive material to impart conductivity while the layer or layers at least substantially free of conductive particles imparts strength. Accordingly, shortcomings of known conductive filaments and tapes in which either strength or conductivity is sacrificed in favor of the other are overcome.

Another advantage is that the invented tapes can easily be prepared in dimensions that match those of nonconductive tapes used to weave fabrics of various types, such that irregularities in the weave and "burying" as occur with conductive filaments are avoided. As a result, weaving efficiency is improved and, when the invented tapes are woven with pigmented or so-called "natural" color tapes, the conductive nature of the resulting fabrics and articles constructed therefrom is readily apparent by visual inspection.

Another advantage of the invented tapes is that they remain conductive after multiple uses, in contrast to products with conductive surface treatments which lose effectiveness over time. Yet another advantage, particularly as compared to fabrics containing conductive metallic filaments or carbon fibers, is that the invented tapes, fabrics and fabric products can be recycled without separation of incompatible filaments.

Advantages of the invented process over processes for making either single layer conductive tapes or conductive filaments include cost benefits from lower conductive particle usage and better quality product. In the invented process, only part of the invented tapes is filled with conductive particles and, therefore, conductive particle usage is considerably lower than in manufacture of conductive single layer tapes or filaments. Moreover, when coextruding layers to form a multilayer film, the substantially nonconductive layer or layers provide support for adjacent conductive layer or layers, such that more uniform thickness of the extruded film is achieved and gaps in the film are substantially avoided. Consequently, higher extrusion rates and throughputs, with better quality product, are more easily attained in the invented process than in production of single layer tapes. The invented tapes also are less likely to break during drawing than are single layer tapes, thereby also facilitating higher production rates, because the conductive particle-free layer imparts greater strength than the conductive particle-filled single layer. Further, slitting is more efficient and less costly in the invented process because the conductive particle-free layer promotes easier slitting into tapes with less damage to slitting blades than in the case of single layer tapes containing conductive particles.

In weaving of fabrics, the invented, conductive tapes also offer advantages over conductive filaments. As discussed above, conductive filaments normally require separate beaming from warp tapes to avoid ridges in woven fabrics and breaking due to increased tension created by the lower circumference of the filament yarns. In contrast, the invented tapes can be beamed simultaneously with other warp tapes to be woven into fabric because the former can be prepared in dimensions and linear densities compatible with the other tapes for weaving purposes.

The invented tapes are easily woven or knitted into fabrics suitable for manufacture of a wide range of finished goods, such as bulk containers, industrial and agricultural bags, backings for carpets and rugs and mining fabrics.

BRIEF DESCRIPTION OF THE DRAWING

FIG. 1 is a side elevation view of a two layer electrically conductive tape according to the invention.

FIG. 2 is a cross-sectional view of the tape illustrated in FIG. 1.

FIG. 3 is a side elevation view of a three layer electrically conductive tape according to the invention.

FIG. 4 illustrates an electrically conductive woven fabric according to the invention.

DESCRIPTION OF THE INVENTION

In greater detail, the electrically conductive tapes of this invention are essentially flat structures having an essentially rectangular cross-section. The tapes have a multilayered construction in which at least one layer comprises thermoplastic polymer composition at least substantially free of electrically conductive particles and at least one other layer provides an essentially flat external surface of the tape and comprises thermoplastic resin composition having dispersed within at least one thermoplastic resin an amount of electrically conductive particles effective to impart electrical conductivity. For purposes hereof the expression "at least substantially free of electrically conductive particles" is used to characterize compositions that are either free of such particles or contain such low levels thereof that neither conductivity nor strength of the base composition is affected to any substantial extent. Individual layers of the invented multilayer tapes are substantially coextensive along the lengths and widths thereof, with a surface of each layer being adhered or joined to a surface of an adjacent layer at an interface therebetween such that overall thickness is made up by the thicknesses of the individual layers thereof. This laminar configuration of continuous layers provides both strength-imparting and conductive layers along substantially the entire length and width of the tapes. It will be appreciated by those skilled in the art that the configuration of the tapes distinguishes them, both structurally and functionally, from filaments. The tapes' essentially flat nature and essentially rectangular cross sections make them well suited for weaving into flat fabrics of the type used for manufacture of bags and containers. When woven in a close weave, such fabrics provide good coverage and weaving efficiency in terms of number of yarns needed to cover a given area. The flat nature of the tapes also ensures substantial contact between warp and weft tapes at their crossover points in the weave, thereby promoting conductivity of the fabrics. Filaments, in contrast, are not as well suited for production of flat fabrics when woven with tapes, nor do they provide the same extent or efficiency of coverage.

Features and attributes of the invented tapes are illustrated in the drawing. As seen in FIGS. 1 and 2, tape 1 has a laminar configuration with conductive layer 3, comprising thermoplastic resin composition with dispersed electrically conductive particles, joined to nonconductive layer 5, comprising thermoplastic resin substantially free of conductive particles, at interface 7 between such layers. FIG. 2 also illustrates the generally flat nature of the invented tapes and their essentially rectangular cross-sections.

The invented tapes can be constructed to achieve strength and conductivities tailored to any desired end use. In general, tapes having resistivities up to about $1\times10^8$ ohms and strengths of at least about 1.8 cN/dtex in the longitudinal direction provide a combination of conductivity and strength well suited to a wide range of end uses. For most end uses, there is little need for resistivities below about $1\times10^4$ ohms and conductive particle loadings needed to achieve lower resistivities can be so high as to complicate manufacture of the tapes. Strength of the invented tapes also must be balanced with elongation. The tapes should be strong enough to resist breakage during weaving and also have sufficient elongation that stresses to which fabrics woven therefrom are subjected do not cause breakage. However, if elongation is too high, conductivity may be sacrificed because stretching can cause interruption of conductive particle-to-conductive particle contact within conductive layers. Generally elongation of about 5 to about 30% is suitable with about 10 to about 25% being preferred to ensure conductivity even in an elongated state. In a preferred embodiment of the invention, in which the tapes are woven into fabrics for intermediate bulk containers of the type used for transporting bulk chemical solids or other solid particulate materials, the tapes preferably have resistivities of about $1\times10^5$ to about $1\times10^7$ ohms, strengths of at least about 2 cN/dtex along the length thereof and elongations of about 15 to about 25%.

Preferred configurations of the invented tapes are two- and three-layered structures. Examples are illustrated in FIGS. 1–3. In a two-layered configuration the conductive layer comprising thermoplastic resin composition including conductive particles and the layer comprising thermoplastic resin composition at least substantially free of conductive particles are joined in laminar contact, with one surface of each layer joined to the other at an interface thereof and the other surface of each layer providing an external, substantially flat surface. A three-layered conductive tape that is most preferred according to the invention is illustrated in FIG. 3. Tape 9 has two conductive layers, 11 and 13, each comprising thermoplastic resin with dispersed conductive particles joined to substantially nonconductive layer 15 such that the latter is sandwiched between the two conductive layers. Such a construction offers not only conductivity and strength, but also, when the so-constructed tapes are used in both the warp and weft of fabrics, they promote good surface conductivity and dissipation of static charge because contact of conductive surfaces of warp and weft tapes at their crossover points is assured by the conductive nature of the layers forming both external surfaces of the tapes.

While two- and three-layered constructions are preferred, the invention contemplates additional layers if desired. For example, additional layers of thermoplastic resin compositions can be incorporated to impart special characteristics, such as flame retardancy, additional strength, antimicrobial properties or other properties, to the tapes and fabrics prepared therefrom. Irrespective of the number of layers, tapes that are most preferred for use in manufacture of conductive fabrics capable of dissipating electrical charge are those configured such that electrically conductive layer or layers provide at least part of both external surfaces of the tapes. In this respect, three-layered tapes are most preferred from the standpoint of cost, ease of manufacture and performance.

Any suitable polymer that can be formed into film and subsequently into tape can be used as the thermoplastic resin of the layers of the invented tapes. Polymers used for adjacent layers can be the same or different and should be compatible in the sense that they can be adhered to each other by heat, pressure, ultrasonic bonding, adhesives, combinations of these or other suitable bonding means. Illustrative of such polymers are polyamides, linear polyesters, and polymers of unsubstituted or substituted olefin monomers, such as polyvinyl chloride, polyacrylamide, polyacrylonitrile, polyvinyl acetate, polyacrylic acid, polyvinyl methyl ether, polyethylene, polypropylene, poly(1-hexene), poly(4-methyl-1-pentene), poly(1-butene), poly(3-methyl-1-butene), poly(3-phenyl-1-propene) and poly (vinylcyclohexane). Homopolymers and copolymers are suitable as are blends of such polymers with one or more other thermoplastic polymers.

Homo- and copolymers based on alpha-olefin monomers of 2 to about 12 carbon atoms and mixtures thereof, such as polyethylene, polypropylene, ethylene-propylene copolymers, polyisobutylene, poly(4-methyl-1-pentene), poly(1-butene), poly(1-hexene), poly(5-methyl-1-hexene) and the like, are preferred. Particularly preferred polyalpha-olefin resins are high, low and linear low density polyethylenes, polypropylene, and propylene-dominated copolymers. Propylene polymer resins are most preferred due to their cost, processability and performance.

The propylene polymer resins most preferred for preparing the invented tapes comprise substantially crystalline homopolymers of propylene or copolymers of propylene with minor amounts, e.g., up to about 30 mole %, of one or more other copolymerizable alpha-olefins, such as ethylene, butene-1 and pentene-1, or blends of propylene polymer with minor amounts, e.g. up to about 20 weight %, of another polyolefin such as low or linear low density polyethylene. Such propylene polymers are well known and commercially available. A particularly preferred propylene polymer resin is homopolymer polypropylene.

Propylene polymer resin into which the electrically conductive particles are incorporated desirably has a melt flow rate of about 1.5 to about 20 grams per 10 minutes to obtain film and tape properties suited to end-use requirements while also facilitating dispersion of conductive particles at loadings high enough to confer substantial electrical conductivity. Polypropylene resins of greater melt viscosity, e.g., melt flow rates below about 1.5 grams per 10 minutes, are less useful because dispersion of electrically conductive particles is difficult. Degradation of propylene polymer during processing may result in melt flow rate increases to up to about two times that of the starting material and, in turn, low melt strength during extrusion and weak films and tapes with thin spots and nonuniform thickness. Accordingly, low melt viscosity propylene polymers, e.g., melt flow rates above about 20 grams per 10 minutes, are not preferred. Preferably, the propylene polymer has a melt flow rate of about 2 to about 15 grams per 10 minutes to obtain good dispersion of electrically conductive particles and ensure formation of films of substantially uniform thicknesses. When propylene polymer is used as the thermoplastic polymer to form the layer at least substantially free of conductive particles, melt flow rates of such polymer suitably range from about 2 to about 20 grams per 10 minutes, and preferably from about 2.5 to about 15 grams per 10 minutes. When film is formed by coextrusion, melt flow rate of the composition comprising conductive particles and thermoplastic polymer utilized for the conductive surface layer or layers is at most equal to, and preferably somewhat lower than, that of the composition used for the substantially nonconductive layer so that the greater melt strength of the former will compensate for the strength-diminishing effect of the conductive particles while the greater flow rate of the latter will, at the same time, promote smooth extrusion of the more viscous filled resin composition. Most preferably, when preparing the invented tapes with coextrusion of multilayer film, a composition comprising propylene polymer having a melt flow rate of about 2 to about 5 grams per 10 minutes, electrically conductive parties and, optionally, up to about 10 weight % low or linear low density polyethylene is used for the conductive layer or layers and a composition comprising propylene polymer resin having a melt flow rate of about 3 to about 8 grams per 10 minutes and at least substantially free of conductive particles is used for the substantially nonconductive layer or layers. Best results in such coextrusion operations are achieved when the ratio of the melt flow rate of the composition used for the conductive layer or layers to the melt flow rate of the propylene polymer resin composition used for the substantially nonconductive layer or layers is about 0.1:1 to about 0.5:1, and especially about 0.2:1 to about 0.4:1. Except as stated otherwise, melt flow rates referred to herein are determined according to ASTM D-1238 at 230° C. and load of 2.16 kg.

Electrically conductive particles useful according to the invention include metallic powders, particulates and whiskers and electrically conductive carbon black. Useful metals include iron, aluminum, silver and copper. The particles should be fine enough to be dispersible in the thermoplastic polymer used for the conductive layer or layers. Generally, average particle sizes less than about 25 microns give good results although for a given material, thermoplastic resin and tape production process, greater particle sizes may be beneficial. Carbon black is a preferred conductive material because of its relatively low cost, dispersability in thermoplastic resins and chemical inertness. It also is better suited to plastics recycling than metallic particles or powders.

Depending on properties, carbon blacks are capable of imparting high electrical conductivity, on the one hand, or extreme resistivity on the other. In the present invention electrically conductive carbon blacks are used to impart conductivity so that electrons can flow through the tape layer or layers containing dispersed carbon black. Electrical conductivity of conductive carbon black is related to its particle size, structure, and volatiles content. Conductivity achieved through use of carbon black according to this invention results from dispersion, within a thermoplastic resin matrix or continuous phase, of electrically conductive carbon black particles with substantial particle-to-particle contact throughout the conductive layer or layers of the invented tapes. Accordingly, for purposes of this invention, the carbon black should be fairly complex in structure and easily dispersed in the thermoplastic resin used to form the conductive layer or layers. So-called medium and high structure carbon blacks, comprising generally bulky, more-or-less irregularly shaped primary aggregates of relatively low density and composed of many prime particles with branching and chaining, are well suited for use in the invented tapes because of their high conductivity and good dispersability. Less highly structured carbon blacks also may be useful but may require higher loading levels than the high or medium structure carbon blacks, with attendant losses of strength and elongation, to achieve good conductivities. Suitably, average particle size of the carbon black is about 15 to about 35 nm, with about 20 to about 30 nm being preferred. Examples of preferred carbon blacks are those identified as Vulcan® XC72R and P, both of which are high structure materials available from Cabot Corporation. Typical properties include nitrogen surface areas of 250 $m^2/g$ and 140 $m^2/g$, respectively, average particle sizes of 30 nm and 20 nm, respectively, volatiles contents of 1.5% and 1.4%, respectively, and densities of 6 $lb/ft^3$ (0.096 $g/cm^3$) and 14 $lb/ft^3$ (0.224 $g/cm^3$), respectively.

Combinations of different carbon blacks can be employed if desired to obtain benefits from each. Conductivity also depends on the level of dispersion of the carbon black or other conductive particles in the conductive layer or layers of the tape. Concentrating the conductive particles in one or both surface layers of the invented tapes promotes efficient usage of conductive particles. Suitably, about 10 to about 40 weight percent of the electrically conductive layer is conductive particles. Below about 10 weight percent, conductivity may be inadequate while above about 40 weight percent, extrusion of conductive layers of uniform thickness is difficult and strength and elongation of the final tapes may be too low for use in weaving or in bag and container fabrics. Use of too much conductive carbon black also can lead to diminished conductivity due to shearing and destruction of carbon black particles. When using electrically conductive carbon black, about 25 to about 35 weight percent conductive carbon black is preferred to impart conductivity with good strength and elongation without complicating film extrusion. In the preferred three-layered tape structures of this invention, each of the outer, conductive carbon black-filled layers preferably contains about 25 to about 35 weight percent conductive carbon black. Most preferably, each such layer contains approximately equal levels of conductive particles so that surface resistivity of each layer is about equal. Of course, different loading levels in the layers can also be utilized if desired to accommodate particular end use requirements.

The multilayer tapes have a construction in which the layer or layers of thermoplastic polymer composition with electrically conductive material incorporated therein constitutes part of the overall thickness of the tapes and the layer or layers of thermoplastic polymer composition substantially free of conductive material constitutes part of the thickness. Generally, the conductive particle-containing layer or layers make up about 10 to about 90% of the thickness and, preferably, about 30 to about 60% to achieve a good balance of strength and conductivity. Most preferably, in a three-layer tape having an inner layer of thermoplastic polymer composition at least substantially free of conductive particles and two outer layers of conductive polymer composition, the inner layer occupies about 40 to about 60 percent of the thickness and each outer layer occupies about 20 to about 30 percent of the thickness. For most applications, outer layer thicknesses in such a configuration are about equal. Overall thickness for multilayer drawn tapes preferably ranges from about 30 to about 200 microns, although thicker tapes are also desirable for some applications.

If desired, one or more layers of the invented tapes also can have additives incorporated therein to impart other characteristics thereto, provided such additives do not interfere with the strength and electrically conductive properties of the tapes or their manufacture. Examples of useful additives include antioxidants, antistatic agents, lubricants, ultraviolet light absorbers, pigments such as titanium dioxide and nonconductive carbon black, delusterants, heat, light and oxidation stabilizers, opacifiers such as chalk and calcium carbonate, antimicrobial agents such as 2,4,4'-trichloro-2'-hydroxydiphenyl ether, flame retardants and various fillers such as talc, calcium carbonate, gypsum, kaoline, silica, and diatomaceous earth. Among these, chalk and calcium carbonate are beneficial when used in the substantially nonconductive layer or layers because they tend to prevent embrittlement of the tapes, thus improving strength and facilitating weaving of fabrics. Average particle diameter of such fillers should generally not exceed about 5 $\mu m$, and desirably is about 1 to about 3 $\mu m$. When filler is used in one or more layers, each such layer preferably comprises no more than about 10 weight percent filler, and more preferably about 0.5 to about 6 weight percent, based on the weight of the polymer component. Higher levels can interfere with processability and dispersion of conductive particles. Chalk, when used, preferably is at about 1 to about 4 weight percent based on weight of polymer.

The invented electrically conductive tapes are formed by a process comprising the steps of forming a quenched film comprising at least one layer of thermoplastic resin composition having incorporated therein an effective amount of electrically conductive particles and at least one layer of thermoplastic resin composition at least substantially free of conductive particles; slitting the quenched film along its length; and orienting the quenched film. Slitting and orienting can be conducted in any sequence. Preferably, the quenched film is slit longitudinally into a plurality of tapes and then the tapes are oriented. However, suitable tapes also are obtained when the quenched film is first oriented and then the oriented film is slit into tapes.

Any suitable technique can be used to incorporate electrically conductive particles into thermoplastic resin. Melt blending, for example in an extruder, typically provides a more uniform dispersion of conductive material than does dry blending. However, dry blending also is suitable and, if conducted prior to melt compounding, may facilitate melt blending and yield more uniform dispersion of conductive particles. Carbon black or other conductive particles can also be incorporated into the polymeric material by Banbury or continuous mixer techniques. Batch-processing on heated two-roll mills can also be used. Concentrates of carbon black or other conductive particles in thermoplastic resins, preferably the same as the resin of the conductive layer, or compatible therewith in the sense of being easily dispersible, melt processible under similar conditions and forming a one phase system, also can be used with good results.

Multilayer films can be formed by any suitable technique, such as extrusion coating, extrusion laminating or other laminating processes, coextrusion and thermal or adhesive bonding of separate film layers. Single layer films prepared by various methods, such as the calender method, extrusion and casting, also can be laminated to other films with adhesives or by application of heat and pressure or they can be coated to form multilayer films. Blown-bubble extrusion and slit-die or T-die extrusion processes are especially preferred for forming both single and multilayer films.

In the blown-bubble extrusion process, a tube of polymer melt is extruded from an annular die, inflated with air to a size dictated by the desired film and tape properties, cooled with refrigerated or ambient blown air, collapsed to form a flat tube and wound onto rolls for subsequent processing. For coextruded multilayer films, the polymer melt tube is formed in multiple layers with at least one external surface layer having electrically conductive particles incorporated therein and at least one other layer being substantially free of conductive particles.

In the slit-die extrusion process, polymer melt is extruded from a slit die to quench means, such as a waterbath or chill roll, that rapidly cools the polymer melt, thereby forming the quenched film. For extruding film, a flat die lip structure is preferably used although a profiled die may also be used. In such processes, the rate of passage of the film through the quench means normally is greater than the rate of polymer melt flow from the die to effect a drawdown. When extruding thermoplastic resin composition containing conductive particles, increasing the extent of drawdown beyond that typically used in extruding the unfilled resin is beneficial in strengthening and stabilizing the film for downstream processing. Slit-die processes are most commonly used in making films from polyolefins.

For producing coextruded films with thermoplastic polymer composition at least substantially free of conductive particles as one or more layers and thermoplastic polymer composition with electrically conductive particles as one or more other layers, an extruder is used to extrude film of thermoplastic polymer composition substantially free of conductive material. One or more other extruders can be used to extrude through the same or a different slot die a film of polymer composition containing conductive particles and the films can be brought into contact, for example, at a nip between two rolls. If a layer of conductive polymer composition is desired on both sides of the composition at least substantially free of conductive particles, then the conductive particle-containing polymer melt can be split between two slot dies with one of the films contacted with the substantially nonconductive film at a first nip and a second film contacted with the other side of the substantially nonconductive film at the nip between a second set of rolls. Alternatively, multiple extruders can be used to supply molten polymer to a coextrusion die that permits two or more distinct layers to be coextruded from a single die.

The conductive particle-containing polymer composition can also be supplied as a molten film which can be contacted with a film layer of thermoplastic polymer composition at least substantially free of conductive particles at or just before the nip of two counter-rotating rolls. Separate films of thermoplastic resin composition with and at least substantially free of conductive particles also can be bonded, for example, by application of heat and pressure or with suitable adhesives, to form the multilayer film.

After forming the film, the film is quenched. Quenching is conducted to cool the film and solidify the resin or resins constituting the same. Quenching can be accomplished by any suitable technique. Examples of suitable quenching techniques include passing the film over a chill roll or through a water bath. Quench times and temperatures will vary depending on line speeds and the particular resin employed and can be easily determined by persons skilled in the art. It is important that quenching of molten film be conducted after sufficient drawdown of the molten film that it is stabilized for downstream processing. During drawdown, polymer molecules of the thermoplastic resin composition used for the conductive and substantially nonconductive layers undergo relaxation of stresses developed during extrusion, orientation or both, such that after quenching the film has sufficient strength and elongation to withstand subsequent stretching or drawing. The electrically conductive particles present in the thermoplastic resin composition used for the conductive layer or layers tend to retard this stress relaxation and orientation; accordingly, quenching of molten film having one or more layers containing conductive particles preferably is conducted after greater drawdown than is normally the case with the unfilled thermoplastic resin. Conveniently, this greater drawdown is accomplished by suitable adjustment of the distance between the extrusion die and the quench means. While it is important that the distance be great enough to achieve suitable drawdown, it also is important that it not be so great that the molten film is allowed to develop gaps or thin spots due to its own weight. Persons skilled in the art will appreciate that limits for such distances will vary depending on resin composition, flow rate and melt strength, together with conductive particle loadings, extrusion and quench systems and operating conditions and, for any given resin, loading level and process, can be determined by experimentation. When extruding conductive carbon black-filled polypropylene resin compositions that are preferred according to the present invention utilizing extrusion equipment having a typical clothes hanger die and a water bath as quenching means, a gap of about 30 to about 45 cm is preferred to achieve the desired drawdown, with about 35 to about 40 cm being more preferred. Other suitable techniques for achieving suitable drawdown of molten, extruded film also can be employed, for example, by adjusting the extrusion rate, the rate at which molten film is fed to the quenching means or both so that the film passes through the quenching means faster than the extrusion rate.

Slitting of the quenched film can be conducted by any suitable technique. Typically a series of parallel cutting or knife blades is used with the film passed thereover under moderate tension. Slitting can be conducted after or, preferably, before orienting the film. If conducted after orientation, the film is slit into tapes having widths suitable for weaving or knitting. Normal widths range from about 0.1 to about 8 millimeters for typical weaving applications and equipment although wider tapes can be made if desired and, if folded or fibrillated, can be woven even on conventional looms. If slitting precedes orientation, greater widths are obtained to account for narrowing of up to 50 percent that can occur as a result of orienting the tapes.

The film or tapes also can be oriented by any suitable technique. It is important that the tapes be oriented at least in the longitudinal direction. While not required, biaxial orientation in both the longitudinal and transverse directions can also be conducted. Orientation provides improved tensile strength of the film or tapes in the direction in which they are oriented and improves their processability. The orienting step normally is conducted at a temperature high enough to soften the film or tapes and cause relaxation of polymer molecules. Orientation in the longitudinal direction preferably is conducted by passing the tapes over a series of rolls rotating at increasing speeds. More preferably, roll speeds are such that the ratio of the speed of a downstream roll to that of an upstream roll is about 2.5:1 to about 8:1. This ratio is referred to as the draw ratio. As will be appreciated by persons skilled in the art, the entire draw can be achieved from one roll or roll aggregate to a succeeding roll or aggregate or, if desired, the total draw can be achieved in stages over several rolls or aggregates. At draw ratios below about 2.5:1, stretching of the tapes may be insufficient to impart adequate strength to the tapes while draw ratios above about 8:1 tend to cause breakage. Draw ratios in the lower end of the range are preferred when the amount of electrically conductive material in a conductive layer is less than about 20–25 weight percent, based on weight of the layer, to retain electrically conductive properties. At higher levels of conductive particles, higher draw ratios are preferred to increase strength while maintaining conductivity.

In a preferred embodiment of the invention, polypropylene tapes are produced from films extruded at temperatures ranging from about 200° to about 290° C. Most preferably, multilayer film comprising at least one substantially nonconductive layer of polypropylene at least substantially free of conductive particles is coextruded in a sandwich configuration between two conductive external surface layers comprising polypropylene resin and containing about 20 to about 40 weight percent conductive carbon black. Best results are attained when the polypropylene from which the substantially nonconductive layer is extruded has a melt flow rate of about 3 to about 8 grams per 10 minutes, and the polypropylene resin from which both conductive layers is extruded has a melt flow rate of about 2 to about 5 grams per 10 minutes, with the ratio of the melt flow rate of the conductive particle-filled resin composition to the melt flow rate of the substantially nonconductive resin composition being about 0.2:1 to about 0.4:1. Such melt flow rates and melt flow rate ratios promote smooth extrusion of films of highly uniform thickness and, in turn, good tape strength and conductivity. In these preferred embodiments, film widths and thicknesses can be selected based on processing equipment and economics and desired end use for the tapes. Preferably the film width is about 0.15 to about 2 meters and film thickness is from about 50 to about 500 microns. The extruded film is drawn down and then quenched, preferably by contact with a chill roll having a surface temperature of about 10° to 50° C. or by immersion in a water bath maintained at about 15° to about 45° C. The quenched film is then dried by application of heat or flowing air.

After quenching, the film preferably is slit into a plurality of tapes by knife blades laterally spaced apart at appropriate distances. The tapes are then oriented by passing them via rotating rolls into a heating zone, such as an oven, and stretching or drawing therein to provide orientation. Preferred temperatures range from about 120° to about 195° C. The degree of stretching for achieving orientation effective to provide tapes with a good balance of strength and elongation is accomplished by drawing at a draw ratio preferably ranging from about 4:1 to about 8:1. Preferably, the resulting tapes have tenacities of at least about 1.8 cN/dtex and elongations of about 10 to about 25%. Most preferably a draw ratio of about 6:1 is used. Following orientation, the tapes can be annealed, if desired, to reduce shrinkage thereof. The tapes are then gathered and individual tapes are wound onto separate spools or fed directly to weaving or knitting equipment. In a preferred embodiment, the tapes are obtained as monoaxially oriented, substantially flat, multilayer structures having a thickness of about 25 to about 220 microns and a width of about 1 to about 5 millimeters.

If desired, either as the tapes are being formed or after forming, the tapes can be "fibrillated". As used herein, the term "fibrillate" refers to discontinuously slitting or cutting a tape in an essentially longitudinal direction to form a plurality of essentially parallel rows of slits with the rows preferably displaced laterally with respect to one another. The longitudinal portion of the tape containing the slits constitutes the fibrillated portion of the tape. The longitudinal portion of the tape between the rows of slits constitutes the unfibrillated portion. The percentage obtained by dividing the fibrillated length by the sum of the fibrillated and unfibrillated lengths and multiplying the quotient by one hundred percent is referred to as the fibrillation ratio. On twisting, fibrillated tapes assume an essentially filament-like configuration. Such fibrillated tapes can offer advantages over conductive particle-filled filaments in terms of strength, elongation and efficiency of use of conductive particles. As such, they can be used not only to form fabrics but also, for example, as conductive thread for stitching and sewing.

For the invented conductive tapes, fibrillation can be conducted to attain a wide range of fibrillation ratios suited to requirements of particular end uses. Fibrillation ratios of about 60 to about 80%, and especially about 70 to about 75%, facilitate weaving due to increased pliability of the tapes imparted by fibrillation. For multilayer tapes, fibrillation also can provide improved conductivity by promoting contact of conductive surfaces of fibrillated warp and weft tapes at their crossover points in fabrics, such that even two-layered tapes will be highly effective for dissipating charge. However, fibrillation also may diminish the strength-imparting effect of the nonconductive layer or layers of the tape and, therefore, a balance should be struck between conductivity and strength.

Fibrillation can be conducted using any suitable apparatus capable of producing essentially parallel rows of slits. Examples are given in British Patent Nos. 1,073,741 and 1,262,853 and U.S. Pat. No. 3,427,912, which are incorporated herein by reference. Preferably, fibrillation is achieved on a standard pin roll fibrillator using pin bars having about 8 to about 60, and more preferably about 10 to about 40, needles per centimeter. The angle of the needles, i.e., the angle between the radius of the needle roller and the needle, can affect the length of the slit formed in the tape. In the present invention, good results are achieved when the angle is about 15 degrees to about 45 degrees. The needle position in the pin bars can be straight or staggered.

For forming fabrics from the invented tapes, conventional weaving looms, warp knitting and stitch bonding machines and other equipment suitable for forming fabric from tapes can be used. A variety of constructions, such as plain weave, rib weave, basket weave, twill weave, satin weave, pillar stitch, tricot construction, etc. can be prepared. Depending on end use of a fabric and degree of electrostatic charge dissipation required, electrically conductive tapes having linear densities of about 200 to about 2,000 denier can be interwoven with nonconductive yarns such that the conductive tapes are spaced about 1 to about 40 cm, and preferably about 1 to about 4 cm in the warp direction and about 2 to about 30 cm in the fill direction. Use of such tapes at such spacings usually is effective to yield fabrics with resistivities up to about $1\times10^8$ ohms and, preferably, about $1\times10^5$ to about $1\times10^7$ ohms. An advantage of the invented tapes is that they can be easily manufactured in dimensions and linear densities well matched to those of standard tapes so that special measures are not necessary in preparing fabrics. While dimensions and linear density of the invented tapes preferably are about the same as those of the nonconductive tapes or yarns of a fabric, it will be understood that the invention also contemplates fabrics in which some or all of the conductive tapes differ in dimension, linear density or both from other yarns of the fabric.

Fabrics having combinations of electrically conductive tapes and conventional thermoplastic tapes useful as fabrics for end use products capable of dissipating electrostatic charge preferably are woven in a plain weave. These fabrics generally have constructions with warp tapes ranging from about 10 to about 40 ends per inch and fill tapes ranging from about 2 to about 40 ends per inch. Suitably, linear densities range from about 200 to about 1,500 denier. Depending on the end use of the fabric and on the degree of electrostatic charge dissipation required, electrically conductive tapes of about 200 to about 2,000 denier can be used at a spacing of about 1 to about 40 cm with preferred spacing of about 2 to about 4 centimeters between conductive tapes in the warp direction and about 2 to about 30 cm between conductive tapes in the fill direction. An example of such a fabric is illustrated in FIG. 4 wherein fabric 17 has conventional warp and weft tapes 19 and 21 interwoven with electrically conductive warp and weft tapes 23 and 25 according to the invention.

Fabrics having combinations of electrically conductive and standard thermoplastic tapes useful as primary carpet backing having improved conductivity and static resistance also are preferably woven in a plain weave construction.

Such fabrics typically have a construction with both warp and weft tapes ranging from about 11 to about 28 tapes per inch, with linear densities ranging from about 100 to about 1500 denier. Preferred warp tapes range from about 200 to about 600 denier and preferred weft tapes range from about 300 to about 1,000 denier. Preferably, the carpet backing fabric has warp tapes ranging from about 20 to about 28 ends per inch having linear densities of about 250 to about 550 denier and fill tapes ranging from about 12 to about 32 ends per inch having linear densities ranging from about 400 to about 900 denier. In such a construction, electrically conductive tapes preferably of about 200 to about 800 denier are used at a spacing of about 1 to about 30 cm, with spacing of about 1 to about 3 cm between conductive tapes in the warp and about 20 to about 30 cm between conductive tapes in the fill being more preferred.

Fabrics having combinations of electrically conductive tapes and conventional tapes useful for containers and bags, such as intermediate bulk containers, having improved conductivity and static resistance also are preferably woven in a plain weave. Preferably, such fabrics have about 6 to about 30 ends per inch in the warp and weft and the tapes have linear densities of about 800 to about 3000 denier. Such fabrics preferably have a construction with warp tapes ranging from about 10 to about 25 ends per inch having linear densities of about 1,000 to about 2,200 denier and fill tapes ranging from about 10 to about 20 ends per inch having linear densities of about 1,200 to about 2,300 denier. Electrically conductive tapes for such fabrics preferably have thicknesses of about 30 to about 180 microns, linear densities of about 700 to about 2,500 denier and are used at a spacing of about 2 to about 40 cm per conductive tape in the warp and about 2 to about 40 cm per conductive tape in the fill. Most preferably the conductive tapes used in such fabrics are three-layered tapes in which about 40 to about 60% of the overall thickness of the tapes is provided by a central layer of thermoplastic resin, most preferably polypropylene, at least substantially free of conductive particles, with two outer surface layers adhered on both sides of the central layer with each such layer making up about 15 to about 35% of the overall tape thickness and in which the surface layers are polypropylene having medium or high structure carbon black incorporated therein. In such tapes, carbon black accounts for about 25 about 35 weight % of each of the conductive layers. Especially preferred conductive tapes for such applications have a nonconductive core making up about 50% of the film thickness and conductive surface layers each making up about 25% of the thickness.

Bags and bulk containers can be constructed from such fabrics in any suitable configuration as is well known. Generally, such bags and containers include a body portion that typically is of substantially rectilinear shape when prepared from flat woven fabrics or of substantially cylindrical shape in the case of circular woven fabric. The interior of the body portion normally communicates with the exterior thereof by means of one or more spouts or tubular sections secured to end panels of the body portion, and lifting loops or handles being secured to the body portion. The fabric of the spouts typically is a lighter weight fabric than the body fabric, while the lifting handles often are of heavier fabric. The fabrics normally are stitched together. For optimum dissipation of static charge, the different fabrics are joined in a manner designed to ensure contact of conductive tapes of one fabric type with those of another. The fabrics can be joined by any suitable means. Stitching with conductive thread can be used to promote contact of conductive yarns. The containers also can be equipped with liners if desired. These normally are constructed of thermoplastic resin and may have conductive particles incorporated therein. A wide range of specific constructions of such bags and containers is well known to those skilled in the art and well suited to use of the invented fabrics.

The invention is illustrated in the following examples, with the understanding that the same are not to be construed as limiting its scope.

Controls

These Control examples illustrate preparation of single layer conductive tapes.

A film was extruded from a polymer composition using an extruder with a slit-die. The polymer composition contained polypropylene homopolymer resin with a melt flow rate of 2.5 grams per 10 minutes and 30–32 weight % medium-structure carbon black based on the weight of polypropylene and carbon black. The carbon black was a medium structure carbon black, identified as Vulcan® PF from Cabot Corporation, having average particle size of about 18–22 nm and volatiles content of 1.4%. The carbon black was incorporated into the resin using a twin screw extruder. Melt flow rate of the carbon black—polypropylene composition was 0.5–1.5 grams per 10 minutes according to ASTM D-1238 at 230° C. and 2.16 kg. Based on weight of the composition, 5 weight % linear low density polyethylene and 5 weight % polypropylene were dry blended with the composition prior to extrusion. Melt flow rate of the linear low density polyethylene was about 2.5 grams per 10 minutes at 190° C. Melt flow rate of the polypropylene was about 2 grams per 10 minutes at 230° C. The resulting composition was dried at 120° C. using a granulate-dry air dryer (Gerco GTT 201/401) operated in a continuous manner.

The extruder used to form the film was a 90 mm single screw extruder operated at a screw speed of about 38 revolutions per minute with the following temperature profile:

| Extruder Barrel Temperatures (°C.) | Zone 1 | 180–200 |
| --- | --- | --- |
| | Zone 2 | 200–220 |
| | Zone 3 | 220–240 |
| | Filter | 210–240 |
| | Adapter | 210–240 |
| | Die | 220–260 |

Film was extruded through a slit-die having a die gap of 0.4 mm into a water bath maintained at a temperature of 35° C. The distance between the die exit and the water level was 30 cm. The film was slit into tapes with stainless steel cutting blades spaced 7.0 mm apart and then fed through an oven heated at 180° C. and having an air gap ratio of 1:1. Two stretching units, each consisting of 7 rolls, were used to feed the tapes to and out of the oven. The first unit operated at 26 meters per minute while the upstream-most unit operated at 143 meters per minute. The draw ratio was 5.5:1. The rolls of the stretching units had a diameter of 190 millimeters. The resulting tapes had linear density of 1800 denier, average thickness of 74 microns and width of 3.0 mm. The tapes had maximum resistivity of $10^6$ ohms determined according to Deutsche Industrie Norm 54345 Part 6, tenacity of 1.9 cN/dtex, average elongation of 10–16% and shrinkage of 7.5%. Tapes with like dimensions and properties were prepared following essentially the same procedure except that spacing of the cutting blades was 7.5 mm and the draw ratio was 6.4:1.

Following essentially the same procedures, with variations in cutting blade spacings (6.0 and 6.5 mm) and draw ratios (5.5:1 and 6.4:1, respectively), 1200 denier conductive tapes with widths and thicknesses of 2.5 mm and 58 microns, respectively, were prepared. These tapes had maximum resistivity of $10^6$ ohms, tenacity of 1.9 cN/dtex, average elongation of 10–16% and shrinkage of 7.5%.

Again following the same general procedure, a film was extruded from a composition containing 50 weight % polypropylene with melt flow rate of 2.5 grams per 10 minutes and 50 weight % conductive carbon black. The film had a streaky appearance and, after slitting, excessive breakage of tapes occurred during stretching. Conductivity of a sample of the film was $10^{13}$ ohms. Poor conductivity was attributed to poor dispersion of carbon black in the polypropylene.

EXAMPLE 1

A three-layered film was extruded using a main extruder and one side extruder with feed block, melt pump and slit-die. A core-layer consisted of polypropylene homopolymer resin with a melt flow rate of 3 grams per 10 minutes measured according to ASTM D-1238 at 230° C. and 2.16 kg. The polymer composition for two outer layers was a polypropylene homopolymer resin with a melt flow rate of 2.5 grams per 10 minutes and 30–32 weight % medium structure carbon black, based on the weight of polypropylene. The carbon black was the same medium structure carbon black that was used in the Controls. The carbon black-filled polypropylene compound had a melt flow rate of 0.5–1.5 grams per 10 minutes. Based on the weight of this compound, 5 weight % polypropylene with a melt flow rate of 3 grams per 10 minutes was dry-blended with the compound. Following drying at 120° C., the resulting composition was fed to the side extruder.

The main extruder was a 60 mm single screw extruder which operated at 20 revolutions per minute with temperature profile settings as follows:

| Extruder Barrel Temperatures (°C.) | Zone 1 | 230 |
|---|---|---|
| | Zone 2 | 230 |
| | Zone 3 | 230 |
| | Zone 4 | 260 |
| | Filter | 260 |
| | Adapter | 260 |
| | Melt Pump | 260 |
| | Feed Block | 286 |
| | Die | 260 |

The side extruder was a 30 mm single screw extruder which operated at a screw speed of 130 revolutions per minute with temperature profile settings as follows:

| Extruder Barrel Temperatures (°C.) | Zone 1 | 213 |
|---|---|---|
| | Zone 2 | 268 |
| | Zone 3 | 298 |
| | Zone 4 | 298 |
| | Adapter | 298 |

The melt pump was operated at 26 revolutions per minute at a pressure of 1400 psi. Film was extruded through a slit-die with an opening of 0.4 mm into a water bath at a temperature of 38° C. The distance between the die exit and the water level was 40 cm. The film was slit into tapes using stainless steel blades spaced about 2.5 mm apart and then fed to an oven maintained at 170° C. with an air gap ratio of 1:3 upper air.

For stretching the tapes, 5 heated roll aggregates of a multi-aggregate drawing system were used. The number of rolls in each aggregate and roll temperatures were as follows:

| Aggregate 1 | 3 rolls | 50° C. |
|---|---|---|
| Aggregate 2 Oven | 5 rolls | 90° C. |
| Aggregate 3 | 3 rolls | 125° C. |
| Aggregate 4 | 5 rolls | 130° C. |
| Aggregate 5 | 10 rolls | 135° C. |

The rolls had diameters of 190 millimeters, takeoff speed was about 175 m/min. and the draw ratio was about 6:1. Drawing occurred between aggregates operating at 30 and 179 m/min.

The resulting tapes contained about 9.5 weight % carbon black based on total weight of the tapes and had a linear density of 350 denier, thickness of 44 microns and width of 1 mm. The conductive layers were 30 percent of the total thickness of the tapes. The tapes had maximum resistivities of $10^6$ ohms, tenacity of 3.5 cN/dtex, average elongation of 25% and shrinkage of 4%.

EXAMPLE 2

Three-layered tapes were made following the general procedure of Example 1 but with variations as described below.

Screw speeds of the main and side extruders were 26 and 180 rpm, respectively, and temperature settings for the side extruder were as follows:

| Barrel Temperatures (°C.) | |
|---|---|
| Zone 1 | 210 |
| Zone 2 | 260 |
| Zone 3 | 290 |
| Zone 4 | 290 |
| Adapter | 290 |

The melt pump was operated at 3.7 rpm and 2000 psi pressure. Width of the slit die was 0.2 mm, distance from the die exit to the quench bath was 35 cm and quench bath temperature was 40° C. Distance between cutting blades was about 6.2 mm. Oven temperature was 175° C. and roll temperatures in aggregates 1–5 were 70° C., 70° C., 125° C., 130° C. and 135° C. Drawing occurred between aggregates operating at roll speeds of 29 and 175 m/min.

The resulting tapes contained about 13 weight % carbon black and had linear density of 1500 denier, thickness of 82 microns and width of 2.5 mm. Conductive layers each made up about 20% of the thickness of the tapes. Resistivity of the tapes did not exceed $10^6$ ohms, tenacity was 3.3 cN/dtex, average elongation was 22% and shrinkage was 1.1%.

As seen from these examples and the controls, all of the tapes except those in the last control had comparable resistivities; however, for the invented tapes of Examples 1 and 2, only 40 and 60% of each tape contained conductive carbon black, as opposed to 100% in the control tapes, thus representing a significant increase in efficiency of conductive particle usage. On a weight % of tape basis, the Example 1 and 2 tapes, with about 9.5 and 13 weight % conductive particles, respectively, had resistivities comparable to those achieved at about 30–32 weight % conductive carbon black in the first two controls, thus representing considerably lower usage of conductive particles. Further, the invented tapes had significantly higher tenacities and elongations than the control tapes.

Comparative Example

The general procedure of Examples 1 and 2 was followed except that the distance between the die exit and the quench bath was reduced to 25 cm. After slitting, tapes broke instantly upon stretching. This was attributed to inadequate drawdown between extrusion and quenching.

I claim:

1. A process for forming electrically conductive tape comprising the steps of (a) coextruding a molten, multi-layer film comprising at least one electrically conductive layer comprising a first thermoplastic resin composition comprising a propylene polymer having a melt flow rate of about 2 to about 5 grams per 10 minutes having dispersed therein an amount of electrically conductive particles effective to impart electrical conductivity to the tape and at least one layer of a second thermoplastic resin composition comprising a propylene polymer having a melt flow rate of about 3 to about 8 grams per 10 minutes, and being at least substantially free of conductive particles wherein such melt flow rates are determined according to ASTM D-1238 at 230° C. under load of 2.16 kg and the ratio of melt flow rate of the first thermoplastic resin composition to melt flow rate of the second thermoplastic resin composition is about 0.1:1 to about 0.5:1;

(b) drawing down the molten film to stabilize the same for downstream processing without formation of gaps or thin spots in the molten film;

(c) cooling the stabilized, molten film to solidify the resin compositions constituting the same;

(d) slitting the film along its length; and (e) orienting the film in at least the lengthwise direction.

2. The process of claim 1 wherein the multilayer film is coextruded in the form of two outer electrically conductive layers and a substantially nonconductive core layer.

3. The process of claim 1 wherein the multilayer film is coextruded in the form of two outer electrically conductive layers and a substantially conductive core layer.

4. The process of claim 1 wherein the molten film is coextruded from a coat hanger die and cooled in a water bath with a gap of about 30 to about 45 cm between the die and the water bath.

5. The process of claim 1 wherein the molten film is cooled with a quenching means and drawing down is achieved by passing film through the quenching means at a rate greater than the rate at which the molten film is coextruded.

6. The process of claim 1 wherein the propylene polymers of the first and second thermoplastic resin compositions comprise polypropylene homopolymers.

7. The process of claim 6 wherein the electrically conductive particles comprise conductive carbon black.

8. The process of claim 1 wherein the quenched film is slit along its length and the slit film is oriented.

9. The process of claim 1 wherein the quenched film is oriented and the oriented film is slit along its length.

10. The process of claim 1 comprising fibrillating the slit film.

* * * * *